*Inventor:*
GEORGE SNEDDON, JR.,
by: Donald G. Dalton
*his Attorney.*

United States Patent Office 2,782,451
Patented Feb. 26, 1957

2,782,451

APPARATUS FOR CLEANING SEAM EDGES FOR WELDING

George Sneddon, Jr., McKeesport, Pa., assignor to United States Steel Corporation, a corporation of New Jersey Application August 27, 1953, Serial No. 376,903

1 Claim. (Cl. 15—304)

This invention relates to an improved apparatus for cleaning inside seam edges of pipe preparatory to welding.

The usual practice in manufacturing large diameter electric welded pipe is to form a steel plate into a cylindrical "can," and then close the seam by welding first on the outside surface and later on the inside surface. The outside weld is applied to the "can" as it passes longitudinally through a welding machine with the seam located uppermost. The inside weld is applied by a welding machine mounted at the end of a long cantilever boom with the seam located at the bottom. After the outside is welded, the resulting crevice on the inside accumulates foreign material, such as mill scale, which must be cleaned out before the inside is welded.

An object of the present invention is to provide improved apparatus for cleaning foreign material from the crevice at the inside of a pipe more effectively than by previous practices.

A more specific object is to provide an improved apparatus in which such material first is brushed loose and then removed by an aspirating action that leaves the seam edges clean for welding.

In accomplishing these and other objects of the invention, I have provided improved details of structure, a preferred form of which is shown in the accompanying drawing, in which.

Figure 1:
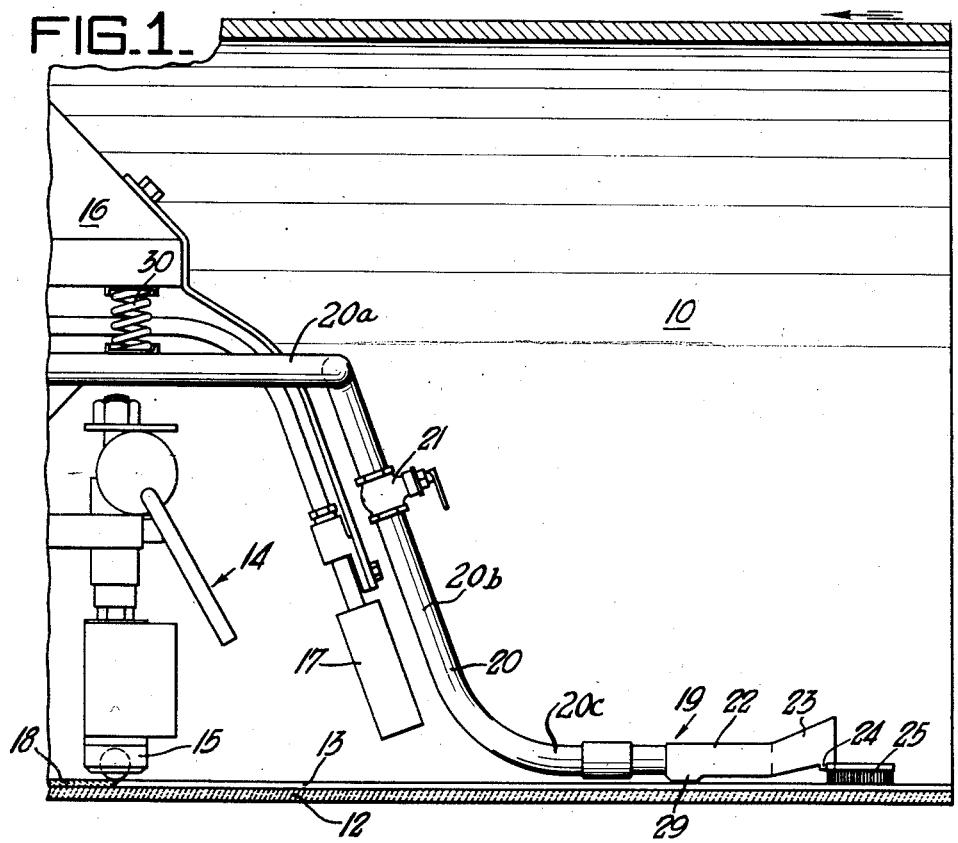
Figure 1 is a side elevational view of a cleaning apparatus constructed in accordance with my invention inside a pipe.

The drawing shows a "can" 10 of steel plate, the seam of which contains an outside weld 12. The inside of the seam contains a crevice 13 where foreign material accumulates and must be removed before the inside can be welded. Figure 1 shows diagrammatically an inside welding machine 14, which can be of any standard or desired construction. The welding machine illustrated includes a welding head 15 and a frame 16 which carries a pre-heater 17 situated in advance of the welding head. The machine is shown in the process of forming an inside weld 18 in the crevice 13.

Figure 2:
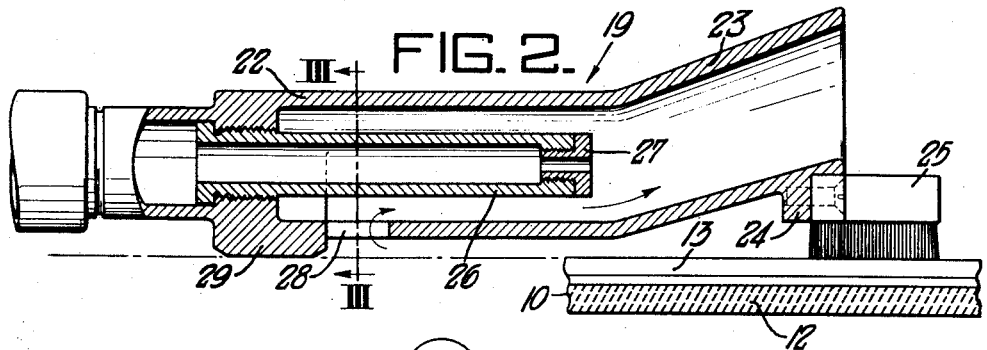
Figure 2 is a vertical longitudinal sectional view on a larger scale of the cleaning apparatus.
Figures 3, 4:
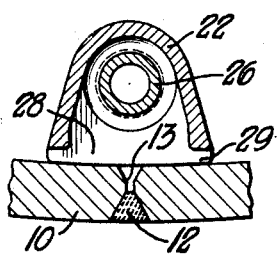
Figure 3 is a vertical cross section on line III—III of Figure 2.
Figure 4 is an end elevational view with the brush removed.

The welding machine carries a cleaning apparatus 19 constructed in accordance with my invention and situated in advance of both the pre-heater 17 and welding head 15. My cleaning apparatus includes a pipe 20 which has an upper horizontal section 20a, a downwardly sloping section 20b and a lower horizontal section 20c. The sloping section contains a two-way valve 21. The lower horizontal section at its discharge end carries a vacuum blast tube 22. The inlet end of the pipe 20 is connected to any suitable compressed air source, not shown. The discharge end of tube 22 has an upwardly sloping section 23, the underside of which carries an integral apertured lug 24 (Figure 2). A wire brush 25 is affixed to said lug in position to contact the surfaces of the crevice 13 and loosen foreign material therein. The inside of tube 22 carries an ejector tube 26, which terminates with a nozzle 27. The underside of tube 22 preferably is flat (Figures 3 and 4) and contains a suction opening 28 spaced rearwardly from the sloping section 23. Behind said opening the wall of tube 22 is extended downwardly to form a rest 29 which contacts the inside of the "can" 10 to space the suction opening above the crevice 13.

The cleaning apparatus 19 can be supported in any desired way from the welding machine 14. The support means illustrated includes a compression spring 30 which is connected between the frame 16 and the upper horizontal section 20a of pipe 20. This spring forces the cleaning apparatus downwardly against the inside of the can 10 and assures that the brush 25 and rest 29 occupy the proper positions in relation to the crevice 13.

In operation, an air blast is directed through the pipe 20, ejector tube 26, nozzle 27 and vacuum blast tube 22. This air blast creates suction within the last named tube, and draws loose foreign material through the suction opening 28. Such material is blown out the discharge end of the tube 22. The brush 25 looses the foreign material ahead of the suction opening 28. The rest 29 and spring 30 assure that the brush and suction opening are properly located for effective cleaning. Suction cleaning has the further advantage that it aids in removing moisture which condenses in the weld crevice rather than depositing moisture therein.

While I have shown and described only a single embodiment of the invention, it is apparent that modifications may arise. Therefore, I do not wish to be limited to the disclosure set forth but only by the scope of the apended claim.

I claim:

An apparatus for cleaning inside seam edges of partially formed pipes preparatory to welding these edges comprising a pipe having in succession an upper horizontal section, a downwardly sloping section and a lower horizontal section, a compression spring bearing against the top of said upper horizontal section and adapted to bear against a portion of a welding machine, said pipe being adapted to have an air stream introduced to its upper horizontal section, a vacuum blast tube carried by the free end of the lower horizontal section of said pipe and having a discharge opening at the end remote from the free end, an ejector tube supported within said vacuum blast tube and communicating with said pipe, a nozzle at the extremity of said ejector tube directed toward but spaced from said discharge opening, a brush on the under side of said vacuum blast tube adjacent the discharge end thereof, said vacuum blast tube having a suction opening rearwardly of said brush and nozzle enabling aspirating action of air discharging from said nozzle to withdraw moisture and foreign material loosened by said brush, and a rest on the under side of said vacuum blast tube behind said suction opening, said spring being adapted to hold said rest in contact with the inside faces of pipes to position said brush and said suction opening, the discharge end of said vacuum blast tube sloping upwardly to avoid deposition to moisture on the seam edges.

References Cited in the file of this patent

UNITED STATES PATENTS 402,662 Donnelly _____ May 7, 1889

(Other references on following page)

UNITED STATES PATENTS

| Number | Name | Date |
|---|---|---|
| 542,669 | Winterbotham | July 16, 1895 |
| 1,233,451 | Davis | July 17, 1917 |
| 1,477,118 | Goodfellow | Dec. 11, 1923 |
| 1,729,093 | Baker | Sept. 24, 1929 |
| 2,043,020 | Thiemer | June 2, 1936 |
| 2,182,344 | Lofgren | Dec. 5, 1939 |
| 2,200,769 | Bjorkman | May 14, 1940 |
| 2,466,644 | McBride | Apr. 5, 1949 |
| 2,495,544 | Peterson et al. | Jan. 24, 1950 |
| 2,619,671 | Humphrey | Dec. 2, 1952 |
| 2,631,114 | O'Brien | Mar. 10, 1953 |

FOREIGN PATENTS

| Number | Country | Date |
|---|---|---|
| 31,267 | France | Oct. 13, 1926 |
| 199,338 | Great Britain | June 11, 1923 |
| 285,510 | Great Britain | June 21, 1928 |
| 648,416 | Great Britain | Jan. 3, 1951 |
| 843,262 | Germany | July 7, 1952 |